US011975479B2

(12) United States Patent
Antoine et al.

(10) Patent No.: US 11,975,479 B2
(45) Date of Patent: *May 7, 2024

(54) METHOD AND DEVICE FOR EXAMINING AN INPUT DATA SET OF A GENERATIVE LAYER BUILDING DEVICE

(71) Applicant: EOS GmbH Electro Optical Systems, Krailling (DE)

(72) Inventors: Vincent Antoine, Munich (DE); Andreas Kahler, Munich (DE); Christoph Mair, Markt Indersdorf (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,220

(22) Filed: Jul. 26, 2021

(65) Prior Publication Data

US 2021/0346957 A1 Nov. 11, 2021

Related U.S. Application Data

(63) Continuation of application No. 15/779,892, filed as application No. PCT/EP2016/080493 on Dec. 9, 2016, now Pat. No. 11,110,517.

(30) Foreign Application Priority Data

Dec. 11, 2015 (DE) .................... 10 2015 225 012.1
Dec. 11, 2015 (DE) .................... 10 2015 225 022.9

(51) Int. Cl.
*B29C 64/124* (2017.01)
*B22F 10/28* (2021.01)
(Continued)

(52) U.S. Cl.
CPC ............ *B29C 64/124* (2017.08); *B22F 10/28* (2021.01); *B22F 10/66* (2021.01); *B22F 10/68* (2021.01);
(Continued)

(58) Field of Classification Search
CPC ......... B22F 10/20; B33Y 10/00; B33Y 50/02; B29C 64/124; B29C 64/153; B29C 64/393; G06F 30/23
(Continued)

(56) References Cited

U.S. PATENT DOCUMENTS 5,252,264 A * 10/1993 Forderhase ........... B22F 12/224
156/272.8
5,904,890 A * 5/1999 Lohner .................. B33Y 10/00
264/401

(Continued)

FOREIGN PATENT DOCUMENTS

DE 102006059829 6/2008
DE 102007056652 5/2009
(Continued)

OTHER PUBLICATIONS

Liu et al. (Modeling of Additive Manufacturing Process Relevant Feature in Layer Based Manufacturing Process Planning, J. Shanghai Jiaotong Univ. (Sci.), 2012, 17(2): 241-244) (Year: 2012).*

(Continued)

*Primary Examiner* — Iftekhar A Khan
(74) *Attorney, Agent, or Firm* — Polsinelli PC

(57) ABSTRACT

The invention relates to a computer-assisted method for examining an input data set of a generative layer building device, including comparing at least one parameter value in a computer-based model of an object that is to be produced using the generative layer building device, to a limiting parameter value which is an extreme value for the parameter (Continued)

able to be obtained in a method for producing the object, and particularly an extreme value for the parameter that can be obtained in a process-stable manner.

12 Claims, 6 Drawing Sheets

(51) Int. Cl.
| | |
|---|---|
| B22F 10/66 | (2021.01) |
| B22F 10/68 | (2021.01) |
| B22F 10/80 | (2021.01) |
| B22F 12/44 | (2021.01) |
| B29C 64/153 | (2017.01) |
| B29C 64/393 | (2017.01) |
| B33Y 10/00 | (2015.01) |
| B33Y 40/20 | (2020.01) |
| B33Y 50/00 | (2015.01) |
| B33Y 50/02 | (2015.01) |
| G06F 30/17 | (2020.01) |
| G06F 30/23 | (2020.01) |
| G06F 119/18 | (2020.01) |

(52) U.S. Cl.
CPC ............ *B22F 10/80* (2021.01); *B29C 64/153* (2017.08); *B29C 64/393* (2017.08); *B33Y 10/00* (2014.12); *B33Y 40/20* (2020.01); *B33Y 50/00* (2014.12); *B33Y 50/02* (2014.12); *G06F 30/17* (2020.01); *G06F 30/23* (2020.01); *B22F 12/44* (2021.01); *B22F 2999/00* (2013.01); *G06F 2119/18* (2020.01); *Y02P 10/25* (2015.11); *Y02P 90/02* (2015.11)

(58) Field of Classification Search
USPC .......................................................... 703/13
See application file for complete search history.

(56) References Cited

U.S. PATENT DOCUMENTS

| | | | | |
|---|---|---|---|---|
| 6,483,596 | B1* | 11/2002 | Philippi | B33Y 50/00 356/615 |
| 6,554,600 | B1* | 4/2003 | Hofmann | B29C 41/34 425/182 |
| 6,824,714 | B1* | 11/2004 | Turck | B29C 64/153 264/308 |
| 7,153,463 | B2* | 12/2006 | Leuterer | B33Y 30/00 264/308 |
| 8,172,562 | B2* | 5/2012 | Mattes | B29C 64/153 425/375 |
| 9,573,225 | B2* | 2/2017 | Buller | B28B 1/001 |
| 9,586,369 | B2* | 3/2017 | Gersch | B05D 1/28 |
| 9,919,476 | B2* | 3/2018 | Paternoster | B29C 64/153 |
| 10,035,188 | B2* | 7/2018 | Weilhammer | B29C 64/386 |
| 10,416,623 | B2* | 9/2019 | Heugel | G05B 15/02 |
| 10,583,482 | B2* | 3/2020 | Heugel | B22F 12/88 |
| 10,792,861 | B2* | 10/2020 | Philippi | B33Y 10/00 |
| 10,807,304 | B2* | 10/2020 | Keller | B33Y 10/00 |
| 10,821,510 | B2* | 11/2020 | Jakimov | B22F 5/009 |
| 10,981,322 | B2* | 4/2021 | Paternoster | B28B 17/0081 |
| 11,110,517 | B2* | 9/2021 | Antoine | B33Y 10/00 |
| 2006/0119012 | A1* | 6/2006 | Ruatta | C23C 26/02 264/497 |
| 2007/0196561 | A1* | 8/2007 | Philippi | B33Y 30/00 118/712 |
| 2008/0131104 | A1* | 6/2008 | Philippi | B23K 26/702 392/407 |
| 2009/0295042 | A1* | 12/2009 | Pfister | B29C 64/153 118/620 |
| 2010/0125356 | A1* | 5/2010 | Shkolnik | B33Y 80/00 700/118 |
| 2010/0192806 | A1* | 8/2010 | Heugel | B22F 10/73 118/712 |
| 2010/0264302 | A1* | 10/2010 | Philippi | B23K 26/144 250/252.1 |
| 2011/0165340 | A1* | 7/2011 | Baumann | B22F 12/17 427/532 |
| 2011/0237731 | A1* | 9/2011 | Paternoster | C08L 77/06 264/401 |
| 2012/0211926 | A1* | 8/2012 | Larsson | B22F 10/362 264/460 |
| 2013/0001834 | A1* | 1/2013 | El-Siblani | B29C 64/124 264/401 |
| 2013/0112672 | A1* | 5/2013 | Keremes | B22F 12/44 219/121.78 |
| 2014/0348691 | A1* | 11/2014 | Ljungblad | B29C 64/153 419/53 |
| 2014/0348692 | A1* | 11/2014 | Bessac | B33Y 10/00 419/53 |
| 2016/0082668 | A1* | 3/2016 | Perret | B29C 64/153 425/135 |
| 2016/0167131 | A1* | 6/2016 | Weilhammer | B28B 1/001 264/401 |
| 2016/0279872 | A1* | 9/2016 | Paternoster | B22F 10/36 |
| 2016/0332379 | A1* | 11/2016 | Paternoster | B33Y 10/00 |
| 2017/0282455 | A1* | 10/2017 | DeFelice | B29C 64/153 |
| 2018/0272611 | A1* | 9/2018 | Cantzler | B22F 10/28 |
| 2020/0247059 | A1* | 8/2020 | Frohnmaier | B33Y 10/00 |
| 2021/0346957 | A1* | 11/2021 | Antoine | B33Y 50/02 |

FOREIGN PATENT DOCUMENTS

| | | | | |
|---|---|---|---|---|
| DE | 102008045984 | | 3/2010 | |
| DE | 102013224693 | | 6/2015 | |
| DE | 102014201818 | | 8/2015 | |
| DE | 102015225012 | A1 * | 6/2017 | ............ B22F 10/20 |
| EP | 2778992 | | 9/2014 | |
| EP | 2778992 | A1 * | 9/2014 | ............... G06F 7/50 |
| EP | 2930694 | | 10/2015 | |

OTHER PUBLICATIONS

Gardan et al. ("Topological optimization of internal patterns and support in additive manufacturing", Journal of Manufacturing Systems 37 (2015) 417-425 ) (Year: 2015).*
International Search Report for Application No. PCT/EP2016/080493 dated Jun. 29, 2017, 11 pages.
Gardan et al., Topological Optimization of Internal Patterns and Support in Additive Manufacturing, Journal of Manufacturing Systems, 37(15), 2014, pp. 417-425 (English), 9 pages.
Sculpteo/Blog, Optimization Tools, pp. 1-4, Nov. 12, 2014, https://www.sculpteo.com/blog/2014/111/12/thickening-tool/ (English), 4 pages.
Kranz et al., Design Guidelines for Laser Additive Manufacturing of Lightweight Structures in TiA16V4, J. Laser Appl., 27(S1), 2014, pp. 7-15 (English), 16 pages.
Meisel et al., An Investigation of Key Design for Additive Manufacturing Constraints in Multimaterial Three-Dimensional Printing, Journal of Mechanical Design, 137(11), 2015, p. 111406 (1-9) (English), 9 pages.
Liu Xi-juan ("Modeling of Additive Manufacturing Process Relevant Feature in Layer Based Manufacturing Process Planning," J. Shanghai Jiaotong Univ. (Sci.), 2012, 17(2): 241-244) (Year: 2012).
Roy et al. ("Evolutionary multi-objective design optimisation with real life uncertainty and constraints," CIRP Annals—Manufacturing Technology 58 (2009) 169-172) (Year: 2009).

* cited by examiner

METHOD AND DEVICE FOR EXAMINING AN INPUT DATA SET OF A GENERATIVE LAYER BUILDING DEVICE

RELATED APPLICATION DATA

This application is a continuation of application Ser. No. 15/779,892, which is now U.S. Pat. No. 11,110,517, filed May 30, 2018, which is a national stage application of PCT/EP2016/080493, filed Dec. 9, 2016, which claims priority to German Application NoS. DE 10 2015 2250229 and DE 10 2015 2250121, each filed Dec. 11, 2015.

TECHNICAL FIELD OF THE INVENTION

The invention refers to a method and device of examining an input dataset of a layer-wise additive manufacturing device as well as to a layer-wise additive manufacturing device that is suitable for carrying out the layer-wise manufacturing method.

BACKGROUND OF THE INVENTION

Layer-wise additive manufacturing methods such as laser sintering or laser melting or stereolithography are excellently suited for a manufacture of parts having a complex geometry and in particular for a manufacture of parts that are individually tailored to a particular user or a particular purpose. The parts are manufactured layer-wise, which means that the part will be formed by stacking cross-sections of the part onto one another. Thus, in the manufacturing process cross-section for cross-section is formed and the individual cross-sections are connected to the underlying and overlying cross-sections.

In order to be able to manufacture a part by means of a layer-wise additive manufacturing device, data must be supplied to the device that include a 3D CAD model (thus in general a computer-based model) of the part. The design of such a CAD model is usually made by a development engineer who is a skilled person on the technical field to which the part belongs and who has detailed knowledge on the operational environment of the part as well as the technical properties this part should have. In the following, such a skilled person is designated as "CAD designer".

Even though in layer-wise additive manufacturing processes there is a large freedom of design for a part compared to other methods, there nevertheless also exist technological boundary conditions that prevent the manufacturing of arbitrary designs. The knowledge whether a particular design that exists as CAD model is able to be manufactured by a layer-wise additive manufacturing method (also termed additive manufacturing method) or not, usually is with the skilled persons that deal with the additive manufacturing. In the following, such skilled persons are designated as "AM experts". The knowledge whether a particular design can be manufactured or not usually requires detailed knowledge and often also an experience with layer-wise additive manufacturing methods that was collected over a long period.

As the specific knowledge on the boundary conditions in the manufacturing of parts usually is not on the side of the CAD designer, an intensive communication between CAD designers and AM experts is necessary in the design process of a model of a part that can be manufactured, which communication delays the design process and binds resources.

Furthermore, possibly only prototypes of a part are manufactured by means of a layer-wise additive manufacturing device. The following series production then is carried out by means of a different method (e.g. CNC milling or injection molding). Also these following methods have specific boundary conditions that have to be considered already when designing a part, so that it needs not be changed again in the transition from the design of prototypes to the series production.

Irrespective of a series production by means of other manufacturing methods (thus not layer-wise additive manufacturing methods), subsequent process steps that may lead to limitations in the design of the model exist also for an exclusive manufacturing by means of a layer-wise additive manufacturing method. For example, after the manufacturing process often a cleaning of laser sintered parts is carried out by using a blasting process for removing powder adhering at the part. Here, the effectiveness of such a cleaning process depends on the part geometry. For example, the removal of adhering powder from intricately formed caves can be very difficult and possibly may even not be feasible with the blasting technique. In particular in medicine or aerospace, the use of unclean parts may have serious consequences.

SUMMARY OF THE INVENTION

Therefore, in view of the just-mentioned problems, it is an object of the present invention to provide an improved method and an improved device by which the design of a part that is to be manufactured by means of a layer additive manufacturing method and, as the case may be, subsequent processes can be simplified and shortened, respectively.

The objective is achieved by a method, an examination device, a layer-wise additive manufacturing device and a computer program.

The method according to the invention is a computer-based method of examining an input dataset of a layer-wise additive manufacturing device comprising at least the following step:

comparison of at least one parameter value in a computer-based model of an object to be manufactured by the layer-wise additive manufacturing device to a limit parameter value, which is an extreme value for the parameter that is realizable in a process used for the manufacturing of the object, in particular an extreme value for the parameter that is realizable in a stable process.

Here, an input dataset for a layer additive manufacturing device substantially comprises a computer-based model of an object to be manufactured by means of the layer-wise additive manufacturing device. Here, for the comparison of parameter values in the computer-based model to limit parameter values, the inventive method may for example access a database in which the limit parameter values of a method used for the manufacturing of the object are stored, which means parameter values that can barely be achieved by this method. Here, a method used for the manufacturing of the object may be the layer-wise additive manufacturing method that can be carried out by means of the layer-wise additive manufacturing device or a manufacturing method of the object on another device than the layer-wise additive manufacturing device or else a post-processing method such as a surface treatment process, in particular also a cleaning process. In particular, a process step is still considered to be a sub-step in the manufacturing of the object, if without this process step no reasonable designated use of the object is possible. If for example the object is a decorative object, one may assume that without a cleaning of the object after the manufacturing process there is no reasonable use possible.

The computer-based model usually is a 3D CAD model of an object to be manufactured. Here, the model may also exist in the STL format and may contain layer information on the individual layers in the intended manufacturing process by a layer-wise additive manufacturing method, respectively.

Thus, within the context of the method according to the invention at least one parameter value from the computer-based model is used for a comparison to a limit parameter value of a method used in the manufacturing of the object. This limit parameter value refers to the process stability of the method, i.e. it represents a limit beyond which it can no longer be guaranteed that the object to be manufactured by the method can be manufactured in a stable process, which means without the occurrence of process irregularities.

Thus, the basic question is not whether the object to be manufactured that is represented by the computer-based model can be manufactured at all. Rather, the question is whether the manufacturing method can be carried out in a reliable way even when being based on parameter value specifications of the computer-based model.

If for example the method is an additive manufacturing of a metal object in a layer-wise fashion by means of a certain layer-wise additive manufacturing device, the following has to be taken into consideration: For certain dimensions (in particular wall thicknesses and the like) of the metal object a deformation of the object may occur during the manufacturing process due to temperature changes in the metal object, which deformation of the object possibly would have no negative effects at all on the metal object even after the completion of the manufacturing process. Nevertheless, such a deformation may lead to an instability of the manufacturing process itself. For example, a recoater in a powder-based layer-wise manufacturing device is no longer able to pass over the previously manufactured portion of the metal object without a collision when applying the next powder layer. Rather, the recoater locally hits the previously manufactured portion of the metal object. From this a further deformation or superficial damage to the recoater and to the metal object, respectively, may result. In an extreme case it can lead to an interruption or even a stop of the manufacturing process.

Thus, the concept of a manufacturing in a stable process is related to whether a method reaches its manufacturing limits (meaning exceeds or, if applicable, goes below the respective limit parameter value) with regard to the at least one parameter value in the computer-based model. Namely, in such a case there will be no guarantee that by means of the method the planned object can be manufactured reliably (thus, in a stable process).

Thus, according to the invention, based on the parameter value information from the computer-based model not (only) a conclusion on the properties of the object to be manufactured is drawn. Rather, a conclusion is drawn on the process stability of the manufacturing process of the object.

Preferably, the method according to the invention comprises furthermore the step of outputting an information to a user for the case that the result of the comparison is that the parameter value lies beyond the extreme value.

Thereby it is possible to provide to the CAD designer immediately during the creation of the design an information, whether the design meets all requirements for a manufacturing in a stable process. This renders time-consuming consultations with AM experts unnecessary.

Usually, but not exclusively, the parameter considered in the comparison will be a dimension. The examination, whether a limit value for the process stability is exceeded, is very simple in such a case.

Preferably, the limit parameter value is an extreme value for the parameter that can be produced by means of the layer-wise additive manufacturing device, in particular an extreme value for the parameter that can be produced by means of the layer-wise additive manufacturing device in a stable process.

The check for potential process instabilities or, the other way round, the verification that based on the computer-based model process stability can be assumed in the manufacturing of the respective object to be manufactured, may in particular also comprise a comparison of several parameter values from the computer-based model, which parameter values are respectively assigned to different parameters, to the respective limit parameter values. In particular, limit parameter values may also be extreme values for a parameter that can barely be manufactured, i.e. realized in principle, with the layer-wise additive manufacturing device. Namely, if a parameter value from the computer-based model is not realizable in principle, a realization of this parameter in a stable process is in particular not possible. In contrast to this, as already mentioned, even if a parameter value can be realized in principle, a manufacturability in a stable process need not necessarily also be available.

In particular, the layer-wise additive manufacturing device may be a very specific layer-wise additive manufacturing device that is characterized as follows:

- a very specific layer-wise additive manufacturing device characterized by a serial number, wherein this manufacturing device is for example specifically optimized,
- a very specific type series of layer-wise additive manufacturing devices such as all devices having the type designation "EOS P390",
- a group of layer-wise additive manufacturing devices (that may well originate from different manufacturers) having a common property (such as a minimum size of the building space, etc.),
- layer-wise additive manufacturing devices that are designed for the handling of a very specific group of materials (such as plastic or metal, if necessary even further limited, for example limited to PA 12),
- layer-wise additive manufacturing devices that carry out a very specific type of layer-wise additive manufacturing method (such as stereolithography devices or SLS (selective laser sintering) devices).

The limit parameters on which the comparison is based determine for which "specific layer-wise additive manufacturing device" the comparison is carried out. Thus, in case the limit parameter values refer to a specific group of layer-wise additive manufacturing devices, the comparison of the respective parameter value to a limit parameter value for devices from this group of layer-wise additive manufacturing devices is made.

Thus, in the context of the method according to the invention at least one parameter value from the computer-based model is compared to a limit parameter value of the specific layer-wise additive manufacturing device. This limit parameter value refers to the process stability of the specific layer-wise additive manufacturing device, i.e. it represents a limit beyond which it can no longer be guaranteed that this specific layer-wise additive manufacturing device can manufacture the object to be manufactured in a stable process, meaning without the occurrence of process irregularities.

Thus, according to the invention, based on the parameter value information from the computer-based model not (merely) a conclusion is drawn on the properties of the manufactured object. Rather, a conclusion is drawn on the process stability of the manufacturing process of the object.

Thus, if in the following parameters and (limit) parameter values are mentioned, this may refer to the parameter values with respect to the process stability of the layer-wise manufacturing device as well as to the parameter values with respect to the just-mentioned manufacturability in principle.

Preferably, limit parameter values predetermined by a layer-wise additive manufacturing method comprise at least a minimum wall thickness, a minimum hole diameter, a minimum blind hole width and/or a maximum blind hole depth, a minimum hole width and/or hole depth, in particular a minimum width and/or depth of an elongated hole, a minimum detail resolution that can be produced by means of the layer-wise additive manufacturing device, a minimum step displacement at surfaces running transversely to several layers, a maximum wall thickness and a user parameter specified by a user, respectively, in particular depending on data of a material provided for the manufacturing of the object that are used and/or on command parameters and/or on wall thicknesses.

The above mentioned parameters individually or in combination usually describe the performance of a layer-wise additive manufacturing device. For example, a minimum hole diameter depends on the heat conduction in the building material that is used, on for example a beam diameter of a laser beam used for the solidification, etc. In particular, the limit parameters may depend on the command parameters used for the control of the layer-wise additive manufacturing device such as the specification of the order by which the individual positions of an object cross-section are solidified.

Preferably, for the case that the result of a comparison is that a parameter value lies beyond a corresponding limit parameter value, an adaptation of such parameter value is carried out automatically and/or with interaction with a user. Thereby, the preparation of a suitable computer-based model for the CAD designer is even more simplified. Due to the interaction with the CAD designer the latter either is led to a design that is actually manufacturable or need not worry at all about the manufacturability and processability of the part and about the process stability of the operation of the layer-wise additive manufacturing device as his designed model of the part is automatically corrected.

In the adaptation of the parameter value, in particular in the automatic adaptation thereof, the parameter value may be set to the limit parameter value. With such an approach, the capacity of the layer-wise additive manufacturing device is fully exploited. In case the limits of the manufacturability and process stability, respectively, shall not be approached, this can be implemented by less stringent limit parameter values.

Further preferably, in the adaptation, in particular in the automatic adaptation, the parameter value can be changed such that a mechanical property of the manufactured object is changed in a predetermined direction Thereby it is possible to take into consideration not only predetermined limits of the manufacturability of a part, but to specify also at the same time, in particular automatically, desired physical properties of the manufactured part.

For example, in the adaptation, in particular in the automatic adaptation, the parameter value is changed such that the weight of the manufactured object is lowered. This can for example be implemented by making struts in a grid structure thinner or by making hollows larger or by introducing hollows into the object or even by manufacturing regions of the part that would normally be massive such that they have an inner structure.

For example, in the adaptation, in particular in the automatic adaptation, the parameter value is changed such that the rigidity and/or the tensile strength and/or the elongation at break at tensile stress and/or Poisson's ratio and/or the torsional behavior and/or the fatigue behavior of the manufactured object is considered and/or changed, in particular optimized. By the mentioned approach, the design becomes even simpler for the CAD designer as by the method important mechanical parameters of a part that is based on the actual design are optimized already at the time of the design. Thereby, the development period for a part can be reduced.

For example, in the adaptation, in particular in the automatic adaptation, of a parameter value the change of the parameter value is specified based on a finite element simulation of a mechanical property of the object to be manufactured. Here, in an ideal case, information on the material composition of the part, in particular on mechanical and physical parameters of the material, are included in the simulation.

Furthermore, in a method according to the invention, if the manufacturing of the object by means of a layer-wise additive manufacturing device is a first manufacturing process, the limit parameter value may be an extreme value for the parameter that can be produced by means of a second other manufacturing process than the first manufacturing process and/or may be an extreme value for the parameter that can be dealt with in a process downstream to the first manufacturing process.

Here, the limit parameter values may refer to a specific post-processing device or to the second manufacturing device (e.g. a series production device), in other words may be parameter values that are barely processable by means of this postprocessing device or are barely manufacturable by means of this second manufacturing device.

Here, the term "specific post-processing device or second manufacturing device" may designate the following different kinds of devices:
- a very specific device characterized by a serial number, wherein this device is for example specifically optimized,
- a very specific type series of devices such as all devices of the same type series having the same type designation,
- a group of devices (that may well originate from different manufacturers) having a common property (such as a minimum size of the building space or the use of the same blasting medium, etc.),
- devices that are designed for the processing or handling of a very specific group of materials (such as plastic or metal, if necessary even further limited, for example limited to PA 12),
- manufacturing devices that carry out a very specific type of manufacturing method (such as injection molding devices, CNC milling devices or SLS (selective laser sintering) devices).

The limit parameters on which the comparison is based determine for which "specific post-processing device or second manufacturing device" a handling and a manufacturability, respectively, are assessed. Thus, in case the limit parameter values refer to a specific group of devices, the handling and a manufacturability, respectively, of a part (object) by means of a device from this group of devices is assessed.

Preferably, limit parameter values predetermined by a post-processing device or second manufacturing device comprise at least one of the following: a minimum wall thickness, a minimum hole diameter, a minimum blind hole width and/or a maximum blind hole depth, a minimum hole width and/or hole depth, in particular a minimum width and/or depth of an elongated hole, a minimum detail resolution that can be dealt with by means of the device used in the downstream process and/or a minimum detail resolution that can be produced by means of the manufacturing device provided for the second manufacturing process, a minimum step displacement at surfaces running transversely to several layers, a maximum wall thickness and a user parameter specified by a user, respectively, in particular depending on used data of a material provided for the first and/or second manufacturing process and/or command parameters and/or wall thicknesses.

The above-mentioned parameters, individually or in combination, usually describe the performance of a post-processing device or of the second manufacturing device (e.g. a series manufacturing device). For example, a minimum hole diameter depends on the heat conduction in the building material that is used, on for example a beam diameter of a laser beam used for the solidification, etc. In particular, the limit parameters may depend on the type of control of the post-processing device or second manufacturing device.

The limit parameter value may for example be a minimum value for a dimension that is modifiable by a method of treating the surface of the object, in particular a method of cleaning the surface of the object, in particular after its manufacturing. As in many cases additively manufactured parts are surrounded by building material during their manufacturing, the cleaning is an important step that is necessary in many manufacturing processes. A corresponding inventive consideration of the performance of the cleaning process already when designing a part is important as in many applications clean part surfaces are vital. However, a consideration of limit parameter values for other surface treatment methods such as coloring methods is also conceivable. In the last-mentioned case a limit parameter value could for example be the minimum diameter of a hole to be colored in the surface.

In particular, the limit parameter value may be a minimum value for a dimension that is modifiable by a method of blasting the surface of the object after its manufacturing. Thereby it becomes possible to gain knowledge on the processability of a part already in the design of the part, in particular concerning blasting methods that are often used for a part cleaning.

In case the suitability for a blasting of the surface of the object to be manufactured is checked already during the design of a computer-based model of the object to be manufactured, this can be done by checking for at least one portion of the surface, whether there exists a further surface portion of the object, which further surface portion is spaced apart from the surface in a direction of the normal to the surface, and by comparing the distance between the at least one portion of the surface and the further surface portion in the direction of the normal with the limit parameter value, if this is the case.

By this modification of the method according to the invention it is possible to determine the suitability for a blasting of a part to be manufactured based on a computer-based model already before the manufacturing in a particularly simple way. This saves unnecessary manufacturing processes that do not lead to usable parts as a sufficient cleaning is not possible.

Furthermore, alternatively or in addition to the just-described method, the suitability for a blasting of the surface of the object to be manufactured can be checked alternatively or in addition to the just-described method also by checking for at least one portion of the surface, whether within an angular range that includes a direction of a normal to the surface there exists a further surface portion of the object that is spaced apart from the at least one portion of the surface and by comparing the distance between the at least one portion of the surface and the further surface portion with the limit parameter value, if this is the case.

By this specific approach it becomes possible to check a suitability for a blasting of surfaces in an even more specific way as more complex geometries of object surfaces may be taken into consideration when assessing the suitability for a blasting. In particular, by adjusting the angular range on which the assessment is based, the method can be adapted to different blasting methods (for example, can be adapted to the size of the grains used for the blasting).

An inventive layer-wise additive manufacturing method of manufacturing at least one three-dimensional object by means of a layer-wise solidification of a building material in powder form or a liquid building material is carried out in a layer-wise additive manufacturing device that comprises:
 a building support for supporting the at least one object to be manufactured;
 an application device for applying a layer of the building material in powder form or the liquid building material on the building support or on a previously applied and selectively solidified layer of the building material,
 a selective solidification device that is able to act on all positions in the applied layer that correspond to a cross-section of the at least one object to be manufactured such that the building material at these positions coalesces to a solid state body, and
 a control unit which controls the application device and the selective solidification device such that the object is manufactured by a successive selective solidification of layers of the building material.

According to the invention an input data set that has been examined by a method according to the invention described before is used for controlling the layer-wise manufacturing process.

An inventive examination device for examining an input dataset of a layer-wise additive manufacturing device comprises:
 a comparison unit which in operation compares at least one parameter value in a computer-based model of an object to be manufactured by means of the layer-wise additive manufacturing device to a limit parameter value, which is an extreme value for the parameter that is realizable in a method used for the manufacturing of the object, in particular an extreme value for the parameter that is realizable by a stable process,
 optionally a storage unit in which a computer-based model of an object to be manufactured by the layer-wise additive manufacturing device is stored,
 optionally a storage unit in which at least one limit parameter value is stored, which is an extreme value for the parameter that is realizable in a method used for the manufacturing of the object, in particular an extreme value that is realizable in a stable process.

An inventive examination device for examining an input dataset of a layer-wise additive manufacturing device comprises:
a comparison unit which in operation compares at least one parameter value in a computer-based model of an object to be manufactured by means of the layer-wise additive manufacturing device to a limit parameter value, which is an extreme value for a parameter that refers to a manufacturing of the object to be manufactured in a stable process, optionally a storage unit in which a computer-based model of an object to be manufactured by the layer-wise additive manufacturing device is stored, and optionally a storage unit in which at least one limit parameter value of the layer-wise manufacturing device is stored, which limit parameter value is an extreme value for a parameter that refers to a manufacturing of the object to be manufactured by a stable process.

In a variation of the examination device, the comparison unit makes a comparison to a limit parameter value that is an extreme value for the parameter that can be produced by means of the layer-wise additive manufacturing device, in particular an extreme value for the parameter that can be produced by means of the layer-wise additive manufacturing device in a stable process.

Preferably, if the manufacturing of the object by means of a layer-wise additive manufacturing device is a first manufacturing process, the comparison unit in the examination device is able to make a comparison also to a limit parameter value that is an extreme value for the parameter that can be produced by means of a second other manufacturing process than the first manufacturing process and/or is an extreme value for the parameter that can be dealt with in a process downstream to the first manufacturing process.

Thereby, the examination device according to the invention makes it possible to reduce the time period from the start of the design of a computer-based model of a part to the completion and, if necessary, cleaning of the part after a layer-wise additive manufacturing process or, if applicable, the completion of the part in a series production method. The examination device may for example be an independent device that may be integrated in a network or else may also be integrated in an existing CAD (Computer Aided Design), CAE (Computer Aided Engineering) or CAM (Computer-Aided Manufacturing) system. Optionally, the examination device may comprise an output device, which for the case that the result of the comparison is that a parameter exceeds or goes below a limit parameter value outputs a corresponding information to a user. Instead of (or in addition to) the respective above mentioned storage units, the corresponding data (computer-based model and limit parameter value, respectively) may in each case also be input into the examination device via at least one input interface configured for receiving these data.

Though, in principle, an automatic adaptation of the design by the examination device is possible, sometimes it is more comfortable for the user of the examination device (e.g. a CAD designer) to be able to specify by himself in which way his planned design shall be adapted by means of specifications at an input device (such as a terminal). Therefore, the examination device according to the invention may optionally comprise an input device for a manipulation of the computer-based model by a user.

If the limit parameter values and the computer-based model of the object to be manufactured are stored in one and the same storage device, the execution of the method is made faster as time losses resulting from long transmission paths for the data are avoided. Here, the storage device either may be included in the examination device according to the invention or such examination device may access the storage device (as the case may be via a network).

An inventive layer-wise additive manufacturing device for manufacturing at least one three-dimensional object by means of a layer-wise solidification of a building material in powder form or a liquid building material comprises the following features:

a building support for supporting the at least one object to be manufactured;

an application device for applying a layer of the building material in powder form or the liquid building material on the building support or on a previously applied and selectively solidified layer of the building material, a selective solidification device that is able to act on all positions in the applied layer that correspond to a cross-section of the at least one object to be manufactured such that the building material at these positions coalesces to a solid state body, and a control unit which controls the application device and the selective solidification device such that the object is manufactured by a successive selective solidification of layers of the building material, wherein the layer-wise additive manufacturing device comprises in particular an inventive examination device for examining an input dataset of a layer-wise additive manufacturing device and/or is connected to such an examination device in terms of signalling.

If the examination device for examining an input dataset of a layer-wise additive manufacturing device is included in the latter or is connected to the same in terms of signalling, alternatively or in addition to the adaptation of the design to the process stability and as the case may be additionally to the manufacturability and processability, respectively, during the design of a computer-based model of a part to be manufactured, the process stability and as the case may be additionally the manufacturability may be checked by an AM expert also immediately before the start of a manufacturing process. On the one hand, the purpose of such a check is the avoidance of unstable manufacturing processes that lead to not usable parts which is linked to a waste of time and resources, on the other hand, it makes the check for process stability by the AM expert easier as there need not be a "manual" check, whether the design observes the limit parameter values, so that errors on the side of the AM expert in the check of the process stability are avoided.

Advantageously, the method according to the invention is implemented by way of a computer program, even if this is not mandatory. Nevertheless, a software-based implementation of the method allows for an easy integration into a CAD, CAE or CAM system or into a layer-wise additive manufacturing device. The software may for example be stored in a memory of the CAD, CAE or CAM system or of the layer-wise additive manufacturing device or the CAD, CAE or CAM system or the layer-wise additive manufacturing device may access the software via a network.

BRIEF DESCRIPTION OF THE DRAWINGS

Further developments of the invention are described in the dependent claims. Here, features from the dependent claims and from the following description of the method according to the invention may also be used for a further development of the device according to the invention or vice versa, except this is explicitly excluded.

DETAILED DESCRIPTION OF THE EMBODIMENTS

Figure 1:
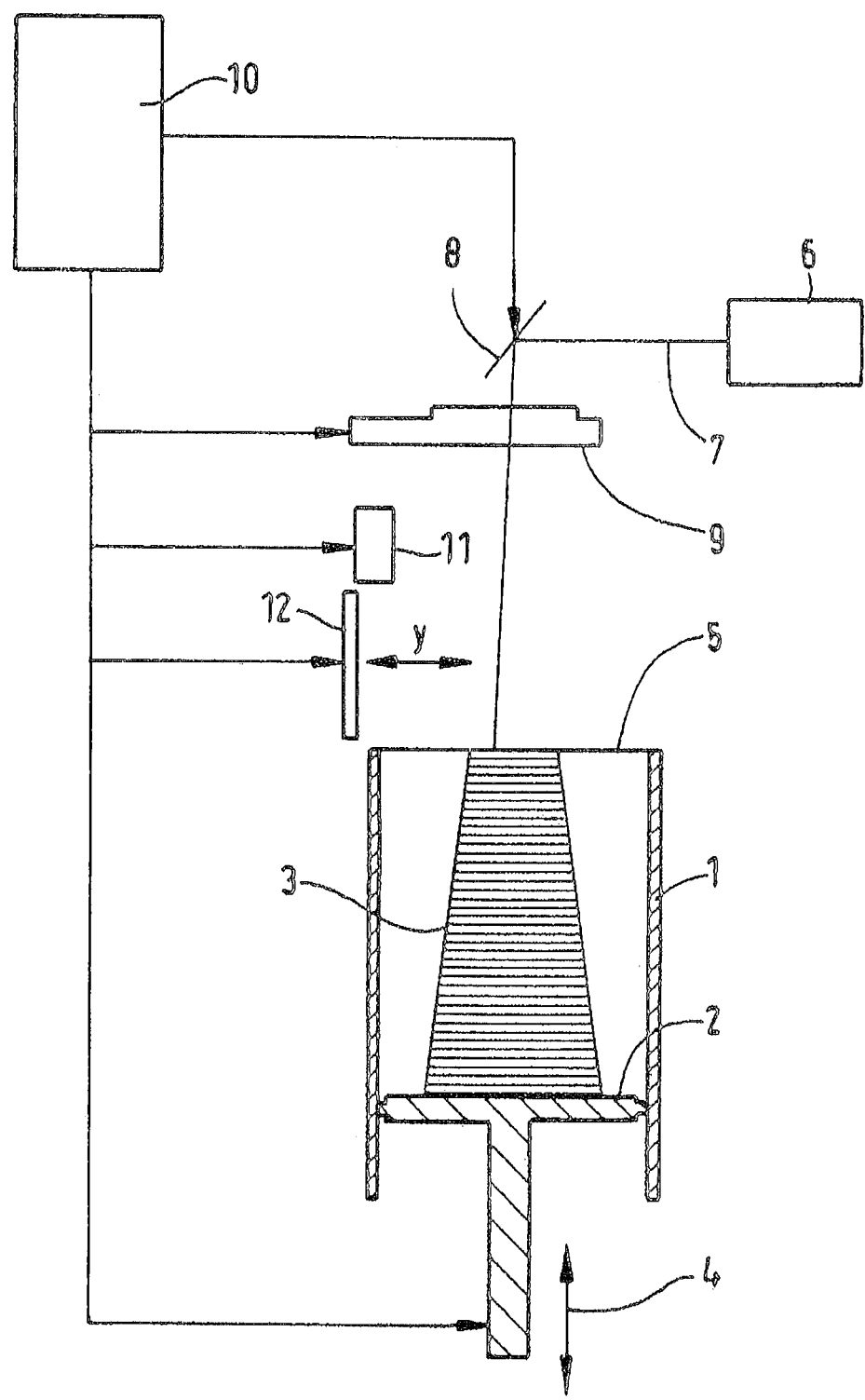
FIG. 1 shows a schematic representation of a layer-wise additive manufacturing device at the example of a laser sintering device.

In the following, for a description of the method according to the invention at first a layer-wise additive manufacturing device according to the invention shall be described at the example of a laser sintering device by making reference to FIG. 1.

The device comprises a construction container 1, in which a support 2 for supporting an object 3 to be formed is provided. The support 2 can be moved in the construction container in a vertical direction by means of a height adjustment device 4. The plane in which the applied building material in powder form is solidified defines a working plane 5. In order to solidify the material in powder form in the working plane 5, a laser 6 is provided that generates a laser beam 7, which is focused onto the working plane 5 via a deflection device 8 and if necessary a focusing unit 9. A control 10 is provided that controls the deflection device 8 and if necessary the focusing unit 9 such that the laser beam 7 can be directed to any arbitrary position of the working plane 5.

The control 10 is controlled by a control command set that a.o. comprises data which include the structure of the object to be manufactured, in particular a three-dimensional CAD layer model of the object with information on the respective cross-section of the object in each layer of the building material to be solidified, and data specifying the exact parameters in the solidification of the building material. In particular, the data contain an exact information on each layer to be solidified in the manufacturing of the object.

Furthermore, a supply device 11 is provided, by which the building material in powder form for the next layer may be supplied. By means of a recoater 12 the building material is applied and is smoothened in the working plane 5.

In operation, by the control 10 the support 2 is lowered layer by layer, the recoater 12 is controlled such that a new powder layer is applied and the deflection device 8 and as the case may be also the laser 6 and/or the focusing unit 9 are controlled such that a respective layer is solidified by means of the laser beam 7 in the working plane 5 at the positions corresponding to the respective object.

All powders and powder mixtures, respectively, that are suitable for the laser sintering process may be used as building material in powder form. Such powders include e.g. plastic powders such as polyamides or polystyrenes, PAEK (polyarylene ether ketones), elastomers such as PEBA (polyether block amides), plastic-coated sand, ceramic powders or metal powders, e.g. stainless steel powders or other metal powders adapted to the respective purposes, in particular alloys.

In the following, the approach according to the invention is described by making reference to FIGS. 2 and 3.

Figure 2:
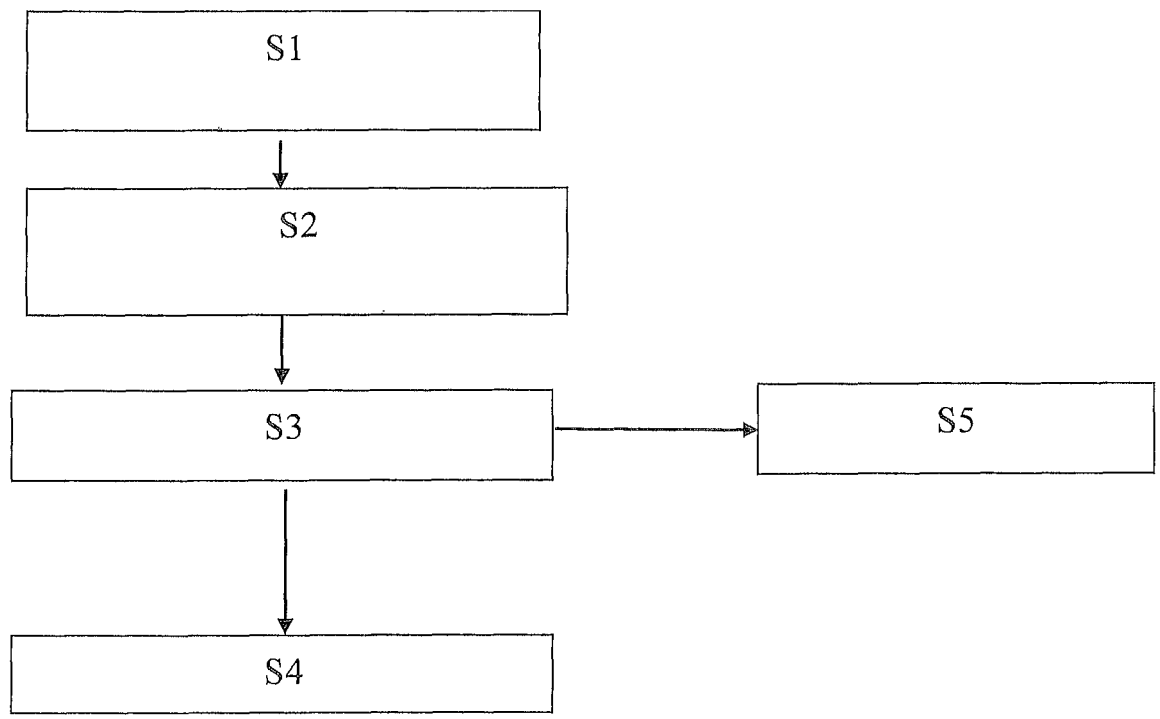
FIG. 2 shows a schematic representation of an inventive method of examining an input dataset for a layer-wise additive manufacturing device and FIG. 3 shows the setup of an examination device according to the present invention.

At first, the model data input unit 101 in the inventive examination device 100 for examining an input dataset of a specific layer-wise additive manufacturing device receives (CAD) model data MD of the part to be manufactured, which model data describe at least a portion of the object to be manufactured (step S1 in FIG. 2). Here, the data MD may also include information on the individual layers during the additive manufacturing method. In addition, also further information may be included, for example on the materials to be used. If the examination device is not integrated in the CAD design system with which a CAD designer designs a part to be manufactured by means of an additive manufacturing method (e.g. as a plug-in), the data MD that originate from the CAD design system may be supplied to the model data input unit 101 either via a network or maybe read into the model data input unit 101 from a mobile data carrier. If the examination device 100 is a component of the CAD design system, the model data input unit 101 may simply access the memory location of the data in the design system. Optionally, the model data MD can be stored in a storage unit 103b included in the examination device 100.

Then, by means of the parameter determination unit 102 parameter values P1 . . . Pn in the model data MD are determined, which parameter values correspond to parameters for which limit parameter values GP1 to GPn are specified (step S2 in FIG. 2). Here, limit parameter values GP1 to GPn are extreme values for parameters of the layer-wise manufacturing device that refer to a manufacturing of the object to be manufactured in a stable process or are extreme values for parameters that can barely be processed in a method for a post-processing of at least a part of the surface of an object manufactured by means of the layer-wise additive manufacturing device, e.g. a cleaning process, and/or parameters that can barely be manufactured in the manufacturing of the object by another device than the layer-wise additive manufacturing device. The other device may for example be an injection molding device that is used for a series production of the parts after first prototypes have been manufactured by means of the layer-wise additive manufacturing device. Here, the set of limit parameter values P1 to Pn may comprise only one limit parameter value P1 or else a plurality of limit parameter values P1 to Pn. The parameters related to the parameter values are e.g. wall thicknesses, hole diameters and channel diameters, respectively, blind hole depths, etc. in the model data MD. The corresponding limit parameter values would then be e g a minimum wall thickness, a minimum hole diameter and minimum channel diameter, respectively, a maximum blind hole depth, etc. In particular, the parameters and limit parameter values may also refer to parameter-based aspects of a layer-wise manufacturing method that are not linked to a manufacturing of an object by a stable process.

The determined parameter values P1 . . . Pn are supplied to the comparison unit 103, which makes a comparison of each of the determined parameter values P1 to Pn with the corresponding limit parameter value GP1 to GPn (step S3 in FIG. 2). Here, the limit parameter values GP1 to GPn may be stored in a storage unit 103a in the examination device 100 or alternatively the limit parameter values are supplied to the examination device 100 via a network or by a mobile data carrier. It shall be remarked that the storage unit 103a (as well as the storage unit 103b) need not mandatorily be a component of the comparison unit 103, even if it is shown in such a way in FIG. 3.

Figure 3:
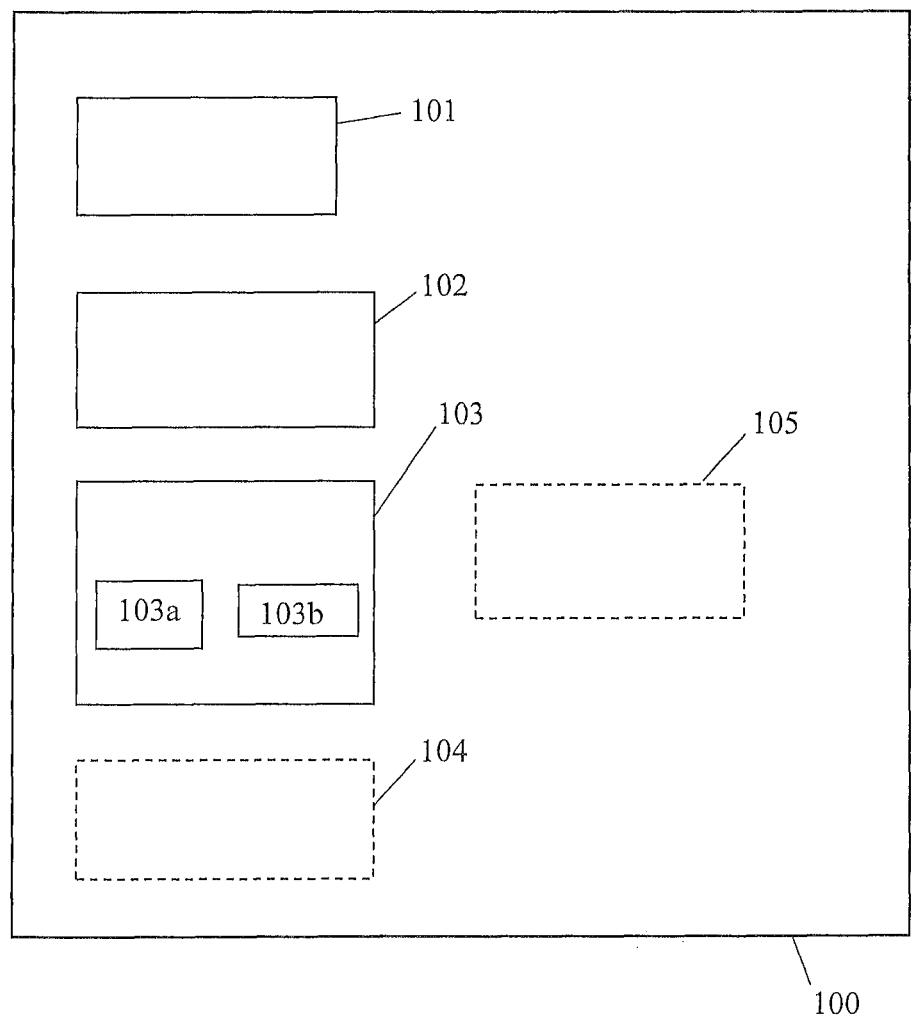

If the result of the comparison is that one or more parameter values exceed or go below the corresponding limit parameter values (e.g. going below a minimum wall thickness or exceeding a maximum blind hole depth), the process in FIG. 2 will proceed to step S4. For this step there are several possibilities for proceeding:

On the one hand, an information unit 104 shown in FIG. 3 may inform a user on one or more limit value exceedances. In such a case, the user (e.g. a CAD designer) has to decide by himself what to do (e.g. adapting the design or changing to another layer-wise additive manufacturing device).

Alternatively or also in addition, the examination device 100 may modify the model data 100 such that the parameter value(s) that exceeded (a) limit value(s) is/are modified. For example, the model data may be modified such that the corresponding parameter values do coincide with the respective limit parameter values. Then, the modified model data may be transferred to the CAD design system via a model data output unit 105 shown in FIG. 3. Again this can be implemented for example via a network or by means of a mobile data carrier or by an access to a storage device, which can also be accessed by the CAD design system.

In case the limit parameter values are not exceeded or underrun, optionally a notice can be output to a user. In FIG. 2 this would be the optional step S5. If the limit parameter values are exceeded or underrun, the method may stop at a first-time limit value exceedance or undershooting with a notice to the user or may be continued until all the model data received by the model data input unit 101 have been completely examined. In the latter case, the user would receive the information on all limit parameter value exceedances or undershoots that occurred. Also when the model data MD are automatically changed by the examination device, it makes sense to check all the model data received by the model data input unit 101.

For example, if the minimum manufacturable wall thickness is underrun in the model, the method according to the invention may indicate to the CAD designer by means of a visual information that there will be a problem in the manufacture. Preferably, also the actual position in the model at which the problem will occur is indicated to the user. This could for example be done by color highlighting in a visualization of the already designed model the position at which there will be a problem in the manufacture. Then, the user may adapt the CAD model, for example by increasing the wall thickness at the designated position, in reaction to the issued warning.

Problems in a CAD model with a wall thickness that is too small may for example result from the fact that, for example in a laser melting method, after the melting of the building material in powder form in that region of a cross-section that crosses a thin wall in the object, the powder in the area neighboring the melted region will strongly bind to the melted region, so that the wall thickness will be increased and cannot go below a minimum wall thickness.

A similar problem can occur when manufacturing a very small hole. Here, the hole may completely disappear due to adhering material so that a minimum hole diameter cannot be underrun. Equivalently, in case the hole is not circular, a minimum hole width cannot be underrun (e.g. in elongated holes) Similarly, a minimum hole depth can be predetermined by the manufacturing process (e.g. by means of a layer-wise additive manufacturing device) or by a post processing method. This may for example be due to a hole depth that is smaller than the thickness of a layer in the layer-wise manufacturing. In general, the method according to the invention may check whether in the designed model a minimum detail that can be manufactured by the layer-wise additive manufacturing device is underrun.

Another problem exists with respect to blind holes. Here, it has to be ensured that after the completion of the manufacturing process unsolidified building material can again be removed from the blind hole. Thus, the blind hole must have a minimum width and/or a maximum depth. In layer-wise additive manufacturing methods surfaces that are running transversely to several layers will have a step displacement (staircase character). Here, it may be indicated to the CAD designer with which resolution a surface running transversely may be realized, meaning what will be the minimum step displacement that can be realized.

Usually, the information with respect to the limit values that can be realized depends on the material used for the manufacture as different materials may for example behave differently in the melting process and may for example conduct heat differently. Also, the control of the manufacturing process or of the post processing method, thus for example the control commands and command parameters, respectively, of a layer-wise additive manufacturing device used for the manufacture will have an influence on the parameter limit values. For example, the laser beam diameter used in a laser melting device plays a role as well as the beam deflection velocity, cooling power, the layer thickness that is used and possibly even the number of objects to be manufactured in the building space. Also from this it is apparent that an estimation whether a part will exceed or underrun the limit parameter values in its manufacturing is a difficult task. At worst, the limit parameter values result from a long time experience and were for example determined at previous similar parts.

For the user of the method according to the invention it is particularly advantageous, if parameters and dimensions, respectively, that exceed or underrun a limit parameter value, are automatically adapted, so that the CAD model is automatically modified at the position at which there will occur a problem in the manufacture. For example, an originally designed wall thickness of 100 μm can be automatically set to 150 μm. Also, a parameter value that for example exceeds or underruns a limit parameter value could automatically be set to the limit parameter value. Staying with the example of the minimum wall thickness, a wall designed with 100 μm would be automatically set to 150 μm, if the limit parameter value is at 150 μm.

The knowledge on the limit parameter values that exist for a layer-wise additive manufacturing device usually is accompanied by knowledge on the building material that is used and on the manufacturing parameters that are used. This makes it possible to simulate the mechanical or physical properties already before the manufacturing of the actual part. This in turn makes it possible to adjust the model already during the CAD design such that a mechanical or physical property of the part is changed in a desired way. For example, after a simulation of the part weight, the model could be changed such that the weight is lowered, for example by decreasing wall thicknesses. In the same way, adaptations of for example the rigidity, of the tensile strength, of the elongation at break at tensile stress, of Poisson's ratio, of the torsional behaviour or of the fatigue behaviour can be made.

In an ideal case, the adaptation of mechanical properties of the part is done automatically by adapting the model after at the start of the design the CAD designer has communicated to the system, which mechanical properties shall be optimized in which way.

As to the mentioned simulation method, known finite element simulation methods can be used as such method.

As already mentioned, the method according to the invention can be implemented by means of a software that is executed on the CAD system. Here, the software may exist as additional module which interacts with the CAD program. The model data may be exchanged between the CAD software and the software module according to the invention for example via a usual interface such as STEP/IGES. Of course, the process is accelerated if the software module according to the invention accesses the same model data as the CAD program, in other words, if both access the same dataset. In particular, this also saves memory space.

In case the examination device according to the invention is implemented as plug-in module for a CAD design system, it is in particular possible to continuously examine for possible exceedances or underruns of limit parameter values during the creation of the design. Thereby, an immediate response can be given to the CAD designer for the case that model features which are not manufacturable are added (e.g. a wall that is to thin). Alternatively, the method according to the invention may automatically change parameter values that are not manufacturable in the background (with or without informing the CAD designer) by an automatic change of the design.

Regardless of the described advantages for a CAD designer, the method according to the invention may of course also run as software on an independent computer system. For example, after the design of a computer-based model of a part has been completed, the manufacturability of the same may be examined before the manufacture of the part. The data exchange between the CAD system and the system with the software according to the invention can be implemented by means of a mobile data carrier or via a network. Possibly, the software by which the method according to the invention is implemented may also run on a computer that is immediately associated to the layer-wise additive manufacturing device by which the manufacture will be carried out or else on the layer-wise additive manufacturing device itself. In an ideal case, an AM expert may make last adjustments immediately before the manufacturing of the part in order to avoid difficulties that may possibly occur in the manufacturing of the part by means of the layer-wise additive manufacturing device or in the manufacturing by means of another device than the layer-wise additive manufacturing device or in a (surface) post-processing following the manufacturing. For the sake of completeness it shall also be mentioned that a data exchange with the layer-wise additive manufacturing device may also be implemented using a mobile data carrier or a network.

Even if further above only a laser sintering device was described as example for a layer-wise additive manufacturing device, the method according to the invention is of course also applicable to other layer-wise additive manufacturing devices and methods. Here, only by way of example, laser melting, LLM (cutting out from sheets and joining), FLM (applying thermoplastic material by means of a nozzle), 3D printing, mask sintering methods and stereolithography methods are mentioned.

Furthermore, the invention is not limited to the design, the manufacturing and processing of a single part. In case several (for example differing) parts are simultaneously manufactured, the method according to the invention in all variations can be carried out in the same way, except that an examination of the manufacturability is carried out for several parts at the same time.

According to the invention, also the manufacturability of the designed model in a series production method that is not a layer-wise additive manufacturing method can be examined, for example after first prototypes of the part have been realized by means of a layer-wise additive manufacturing method. A device for the manufacturing of the part which is based on the same CAD model on which also the manufacturing by means of a layer-wise additive manufacturing device is based, can e.g. be an injection molding device, a CNC milling device, a casting device, an extrusion device, etc. or even a different layer-wise additive manufacturing device than the one by which the prototypes were manufactured.

Figure 4:
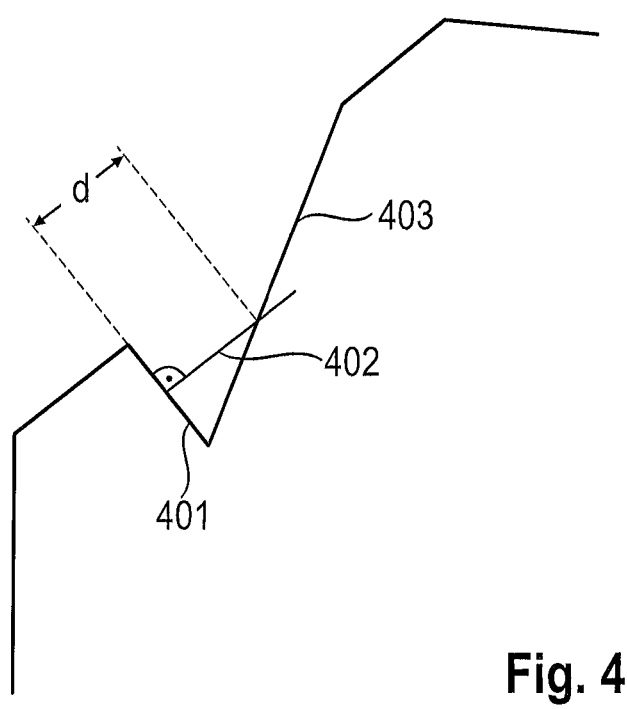
FIG. 4 schematically shows the approach in an embodiment of a method of checking the suitability for a blasting of a surface.
Figure 5:
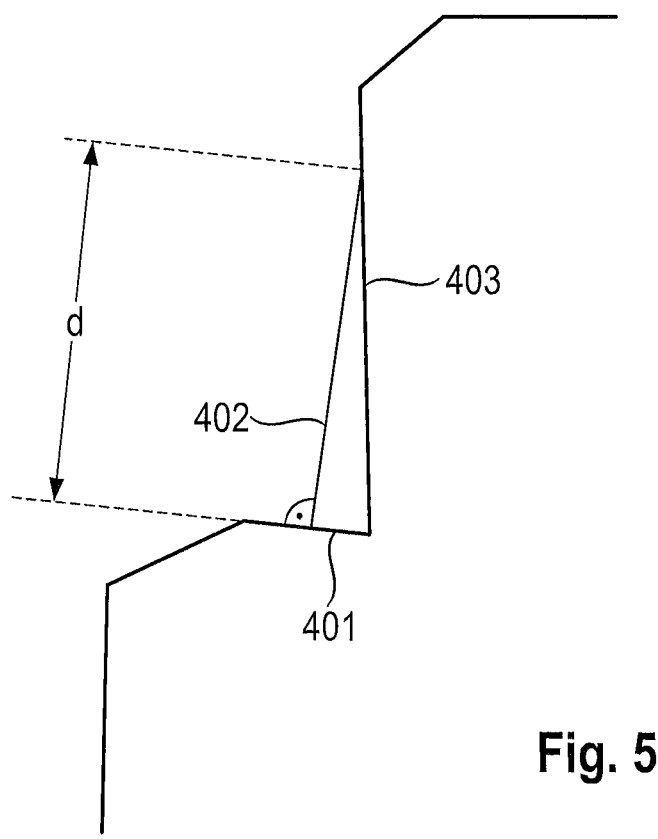
FIG. 5 exemplarily shows a correction of the surface geometry for establishing a suitability for blasting.

In an embodiment of the method according to the invention, the suitability for blasting of a part that has been manufactured based on a CAD model is examined. This is done already before the manufacturing of the part by means of a layer-wise additive manufacturing device or before the manufacturing by means of a different device in a series production method. In the following, the approach is explained with reference to FIGS. 4 to 6:

At first, the 3D CAD model has to be converted to a format in which the outer surface of the corresponding part is described by means of a tessellation meaning a covering with partial surfaces, e.g. polygons such as triangles, quadrangles, pentangles, etc. This is for example the case for the widely used STL format, in which the surface is described by a cover with triangles abutting each other. Then, a plurality of single polygons and partial surfaces, respectively, that are spread over the surface as uniformly as possible (not mandatorily) has to be selected. Now, for each polygon the following method is carried out:

FIG. 4 shows a cross-section of an area of the surface of a part to be blasted together with a selected polygon and a surface portion 401, respectively. For this surface portion it is checked at a defined position of the area (for example in each of the selected surface portions the geometric center S of the area), whether in a direction of the surface normal 402 that is pointing to the outside there exists a further surface portion 403 that is spaced apart from the surface portion 401. If this is the case, the distance d between the two surface portions 401, 403 in the direction of the surface normal 402 is determined and compared to a limit value (limit parameter value). In case the limit value is underrun, it is specified that the initially selected surface portion 401 is not suitable for blasting. In such a case an information is output to the user or an automatic adaptation (e.g. an increase of the distance d by a rotation of the portion 401 anti-clockwise as indicated in FIG. 5) is made. Here, it is mentioned again that all possible variations and approaches as described further above with respect to the examination of the manufacturability are equally applicable to the present embodiment.

The described approach does not depend on the type of tessellation, in particular the shape of the surface portions. These need not necessarily be polygons and also need not necessarily be all of the same type, meaning e.g. need not all be triangular. In theory, also mixtures of e.g. triangles and pentangles or pentangles and circles (with intermediate shapes), etc. are possible.

Furthermore, it would be theoretically also possible to select at random only one surface portion 101 and to carry out the method explained in FIG. 4 for this surface portion. As to the position of the point within a surface portion at which the surface normal is located, there are no limitations. However, it always makes sense to specify the position of this point in all selected surface portions in the same way. For example, for triangular surface portions in each case also the incenter or the circumcenter or another distinguished point within the triangular area may be selected.

Figure 6:
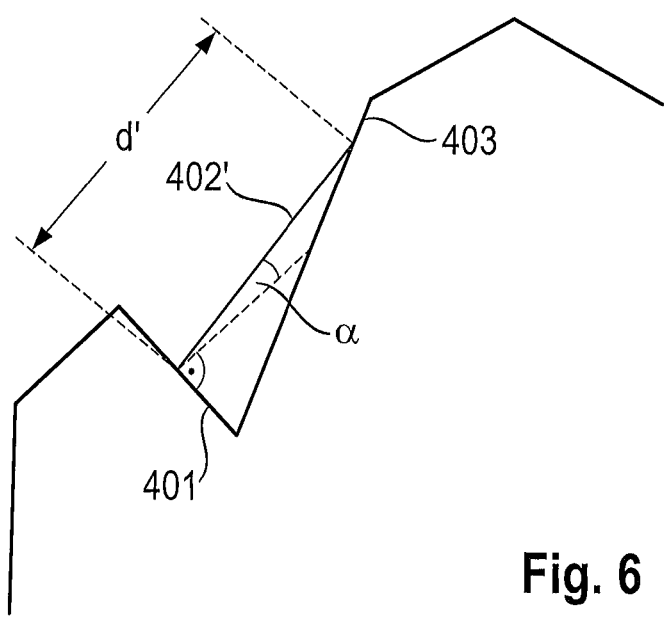
FIG. 6 schematically shows the approach in a further embodiment of a method of checking the suitability for a blasting of a surface.

A modified embodiment in which the suitability for blasting is assessed will be described with reference to FIG. 6. According to this modification, the distance to a possible further surface portion at a defined position of the area is not checked in the direction of the surface normal 402, but in the direction of at least one beam 402' that is at an angle of α

(<90° to the surface normal. Preferably, such a distance d' may be specified also for a plurality of beams 402', which all are within a predetermined angular range around the surface normal 402.

Apart from the angles that are different from 90°, the approach (including all possibilities of variation) is the same as described above with respect to the use of the surface normal 402. This means that if a determined distance d' is smaller than a limit value, it will be specified that there is no suitability for a blasting of the surface portion 401.

It is also possible to proceed such that in a case in which the limit value for the distance along the surface normal 402 between two surface portions is underrun, it is determined in addition, whether the limit value is underrun also for a beam 402' that is at an angle of a to the surface normal. Again, the examination can also be made for a plurality of beams 402' within a predetermined angular range around the surface normal 402. For example, it can be specified that there is always a suitability of a surface for blasting, if within the angular range there exists at least one beam 402', along which the limit value is not underrun.

The extent of the angular range in the last-mentioned modification depends on the material of the part, on the blasting material and on further blasting parameters. However, in the last-mentioned modification a suitability for blasting can be assessed in a more complex way and depending on the blasting parameters it can be individually specified whether there exists a suitability for blasting or not.

Finally, it shall be mentioned that the individual components of a device for examining an input dataset of a layer-wise additive manufacturing device can also be implemented only by hardware components or mixtures from hardware and software. The device then has to have an input interface via which the CAD model data can be supplied and also the limit parameter values can be supplied. Interfaces mentioned in the present application need not necessarily be implemented as hardware components, but can also be implemented as software modules, for example when the data input and output, respectively, via such interfaces can be taken over by another component already implemented on the same device or need to be transferred to the other component only by software. Also, the interfaces could consist of hardware and software components, such as a standard hardware interface that is configured by software for a particular purpose. Furthermore, several interfaces may also be combined in a common interface such as an input output interface.

The invention claimed is:

1. A layer-wise additive manufacturing method of manufacturing at least one object by a layer-wise solidification of a building material in powder form or a liquid building material in a layer-wise additive manufacturing device, the layer-wise additive manufacturing device comprising a building support that supports the at least one object to be manufactured, an application device that applies a layer of the building material in powder form or the liquid building material on the building support or on a previously applied and selectively solidified layer of the building material, a selective solidification device that is able to act on all positions in the applied layer that correspond to a cross-section of the at least one object to be manufactured such that the building material at the positions coalesces to a solid state body, and a control unit that controls the application device and the selective solidification device such that the object is manufactured by a successive selective solidification of layers of the building material, the manufacturing method being a first manufacturing method and comprising:

examining, with a computer-based method, an input data set for controlling the layer-wise additive manufacturing of the object by the layer-wise additive manufacturing device, the step of examining including comparing at least one parameter value in a computer-based model of the object to be manufactured to a limit parameter value, wherein the limit parameter value is an extreme value for a parameter that can be produced by a second manufacturing process different from the first manufacturing process, the second manufacturing process using a manufacturing device different from the first manufacturing process to manufacture a second object, and/or the limit parameter value is the extreme value for the parameter that can be dealt with in a post-processing process downstream to the first manufacturing process; and wherein when a result of a comparison is that the parameter value lies beyond a corresponding limit parameter value, an adaptation of the parameter value is carried out automatically and/or with interaction with a user.

2. The layer-wise additive manufacturing method according to claim 1, wherein the computer-based method further comprises:

outputting an information to the user when the result of the comparison is that the parameter value lies beyond the extreme value.

3. The layer-wise additive manufacturing method according to claim 1, further comprising changing the parameter value such that the weight of the manufactured object is lowered in the automatic adaptation.

4. The layer-wise additive manufacturing method according to claim 3, further comprising changing the parameter value such that a rigidity and/or a tensile strength and/or an elongation at break at tensile stress and/or a Poisson's ratio and/or a torsional behavior and/or a fatigue behavior of the object is considered and/or changed and/or optimized in the automatic adaptation.

5. The layer-wise additive manufacturing method according to claim 1, wherein the limit parameter value comprises at least one of the following:
a minimum wall thickness;
a minimum hole diameter;
a minimum blind hole width and/or a maximum blind hole depth;
a minimum width and/or depth of an elongated hole;
a minimum detail resolution that can be dealt with by the device used in the downstream process and/or a minimum detail resolution that can be produced by the manufacturing device provided for the second manufacturing process;
a minimum step displacement at surfaces running transversely to a plurality of layers;
a maximum wall thickness; and
a user parameter specified by the user; and
wherein the limit parameter value depends on used data of a material provided for the first and/or second manufacturing process and/or command parameters and/or wall thicknesses.

6. The method according to claim 1, wherein the limit parameter value comprises a minimum value for a dimension that is modifiable by a method of treating a surface of the object after its manufacturing.

7. The method according to claim 6, wherein the limit parameter value is a minimum value for a dimension that is modifiable by a method of cleaning the surface of the object after its manufacturing.

8. The method according to claim 6, wherein the limit parameter value is a minimum value for a dimension that is modifiable by a method of blasting the surface of the object after its manufacturing.

9. A layer-wise additive manufacturing method of manufacturing at least one object by a layer-wise solidification of a building material in powder form or a liquid building material in a layer-wise additive manufacturing device, the layer-wise additive manufacturing device comprising, a building support that supports the at least one object to be manufactured, an application device that applies a layer of the building material in powder form or the liquid building material on the building support or on a previously applied and selectively solidified layer of the building material, a selective solidification device that is able to act on all positions in the applied layer that correspond to a cross-section of the at least one object to be manufactured such that the building material at the positions coalesces to a solid state body, and a control unit that controls the application device and the selective solidification device such that the object is manufactured by a successive selective solidification of layers of the building material, the method being a first manufacturing method and comprising:

examining, with a computer-based method, an input data set for controlling the layer-wise additive manufacturing of the object by the layer-wise additive manufacturing device, the step of examining including comparing at least one parameter value in a computer-based model of the object to be manufactured to a limit parameter value, the limit parameter value being an extreme value for the parameter that is realizable in a process used for the manufacturing of the object, wherein if the manufacturing of the object by a layer-wise additive manufacturing device is a first manufacturing process, the limit parameter value is a minimum value for a dimension that is modifiable by a method of blasting a surface of the object after its manufacturing;

wherein a suitability for a blasting of the surface of the object to be manufactured is checked by checking for at least one portion of the surface, whether there exists within an angular range that includes a direction of a normal to the surface, a further surface portion of the object that is spaced apart from the at least one portion of the surface, and by comparing a distance between the at least one portion of the surface and the further surface portion, with the limit parameter value, if this is the case; and wherein when the result of a comparison is that a parameter value lies beyond the limit parameter value, an adaptation of the parameter value is carried out automatically and/or with interaction with a user.

10. A layer-wise additive manufacturing device for manufacturing at least one three-dimensional object by a layer-wise solidification of a building material in powder form or a liquid building material, the layer-wise additive manufacturing device being a first additive manufacturing device and comprising a building support that supports the at least one object to be manufactured, an application device that applies a layer of the building material in powder form or the liquid building material on the building support or on a previously applied and selectively solidified layer of the building material, a selective solidification device that is able to act on all positions in the applied layer that correspond to a cross-section of the at least one object to be manufactured such that the building material at these positions coalesces to a solid state body, and a control unit that controls the application device and the selective solidification device such that the object is manufactured by a successive selective solidification of layers of the building material, wherein the layer-wise additive manufacturing device comprises or is connected to an examination device that examines an input dataset of the layer-wise additive manufacturing device, the examination device comprising:

a comparison unit that compares at least one parameter value in a computer-based model of an object to be manufactured by the layer-wise additive manufacturing device to a limit parameter value, wherein if the manufacturing of the object by the first additive manufacturing device is a first manufacturing process, the limit parameter value is an extreme value for a parameter that can be produced by a second manufacturing process different from the first manufacturing process and using a second manufacturing device to manufacture the object, and/or the limit parameter value is an extreme value for the parameter that can be dealt with in a post-processing process downstream from the first manufacturing process;

a storage unit in which the computer-based model of an object to be manufactured by the layer-wise additive manufacturing device is stored; and a storage unit in which the at least one limit parameter value is stored.

11. The layer-wise additive manufacturing device according to claim 10, wherein the limit parameter value is an extreme value for the parameter that can be produced by the layer-wise additive manufacturing device in a stable process.

12. The layer-wise additive manufacturing device according to claim 10, wherein the computer-based model of the object to be manufactured by the layer-wise additive manufacturing device and the limit parameter value are stored in a same storage device.

\* \* \* \* \*